Dec. 21, 1937.    H. SINCLAIR    2,102,755
POWER TRANSMISSION MECHANISM
Filed Sept. 19, 1931    5 Sheets-Sheet 1
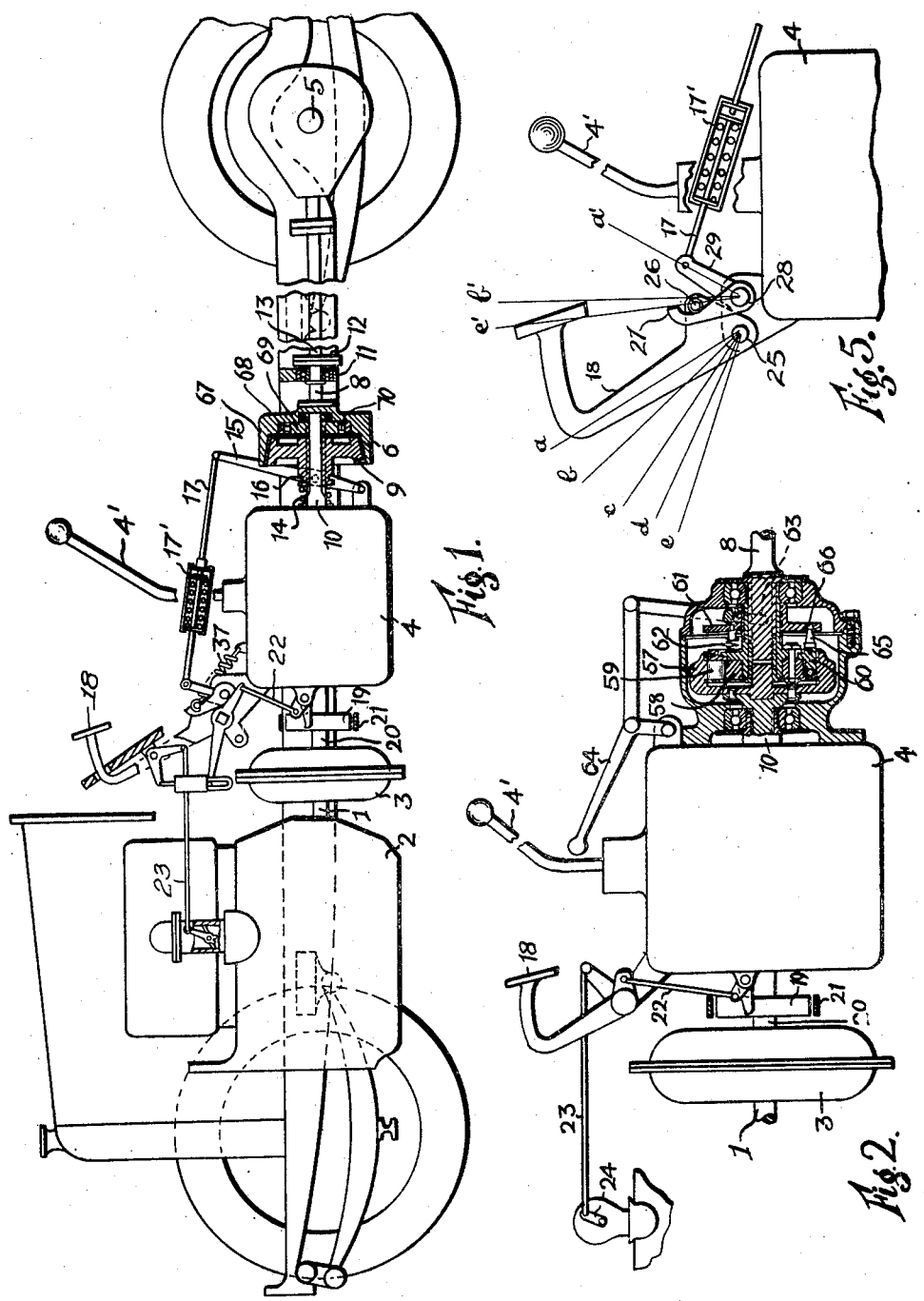
INVENTOR
*Harold Sinclair*
BY
*Dean Fairbank Hirsch Foster*
ATTORNEYS

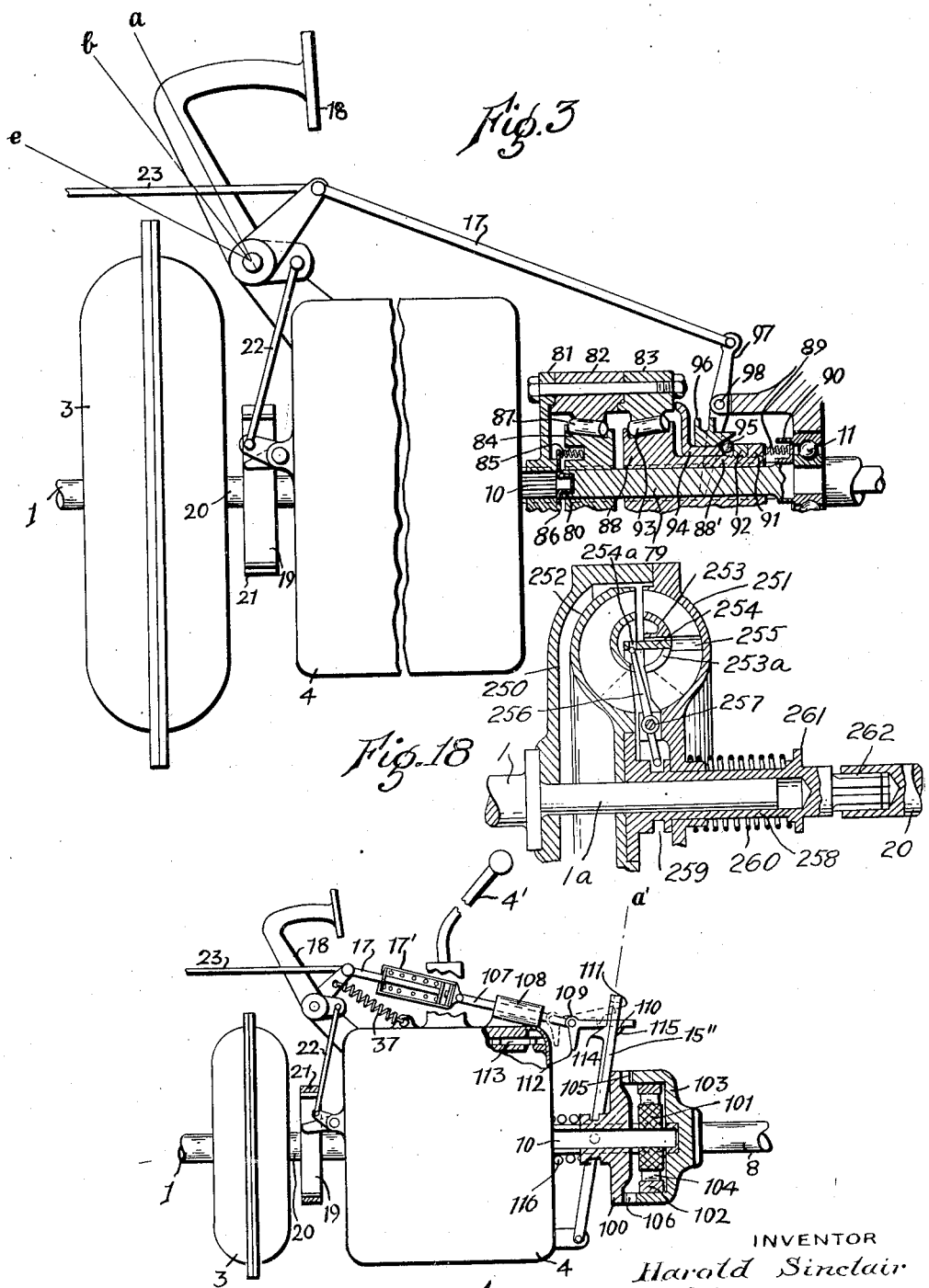

Dec. 21, 1937.    H. SINCLAIR    2,102,755
POWER TRANSMISSION MECHANISM
Filed Sept. 19, 1931    5 Sheets-Sheet 3
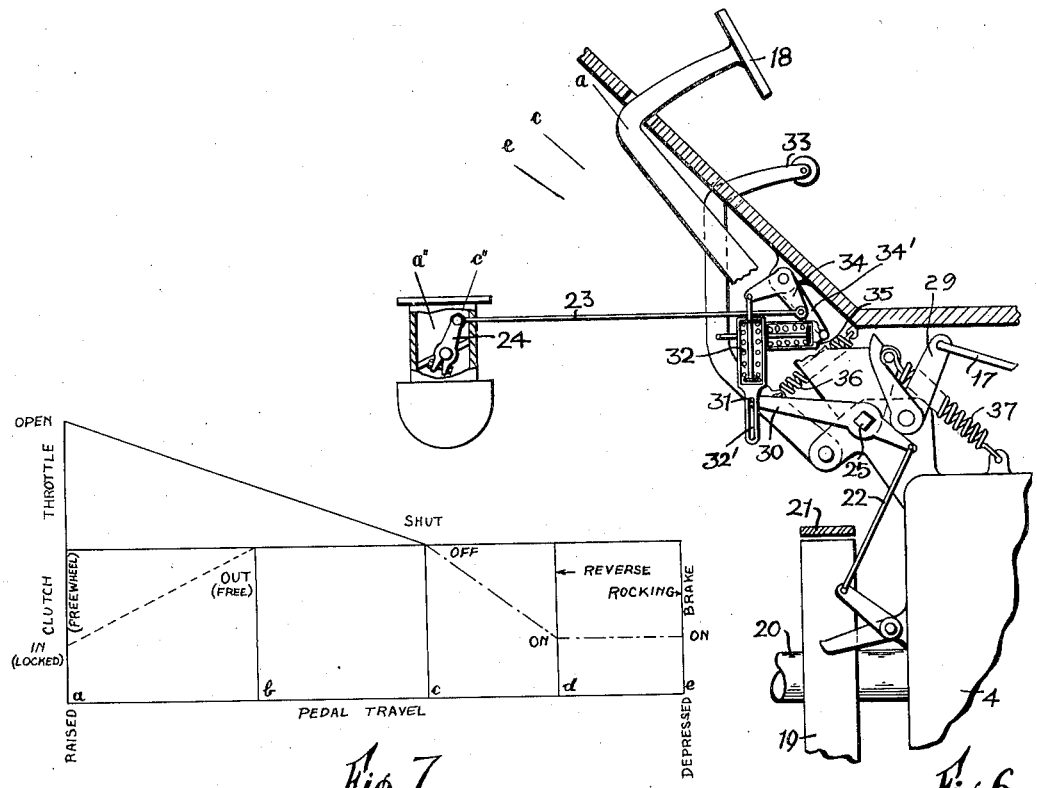
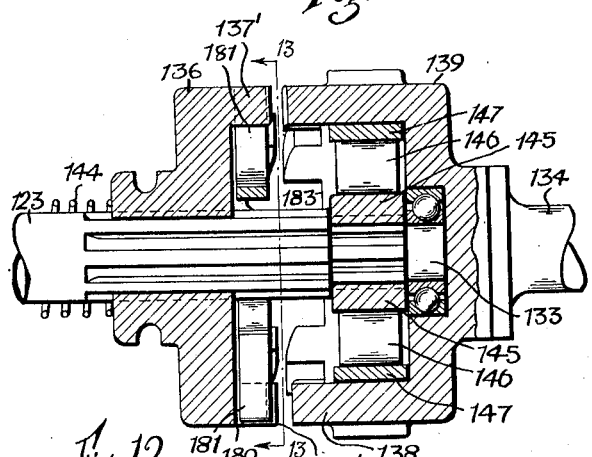
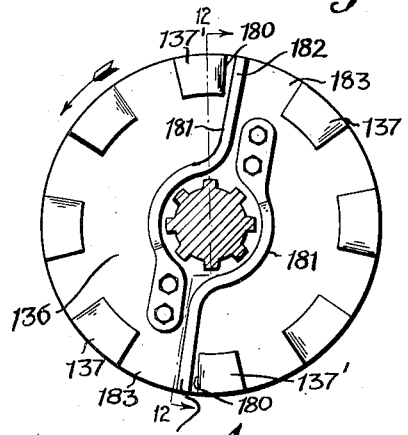
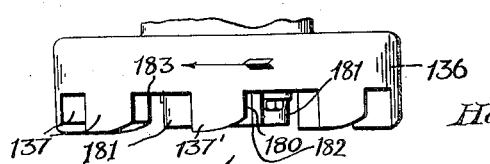
INVENTOR
*Harold Sinclair*
BY
*Dean Fairbank Hirsch & Foster*
ATTORNEYS

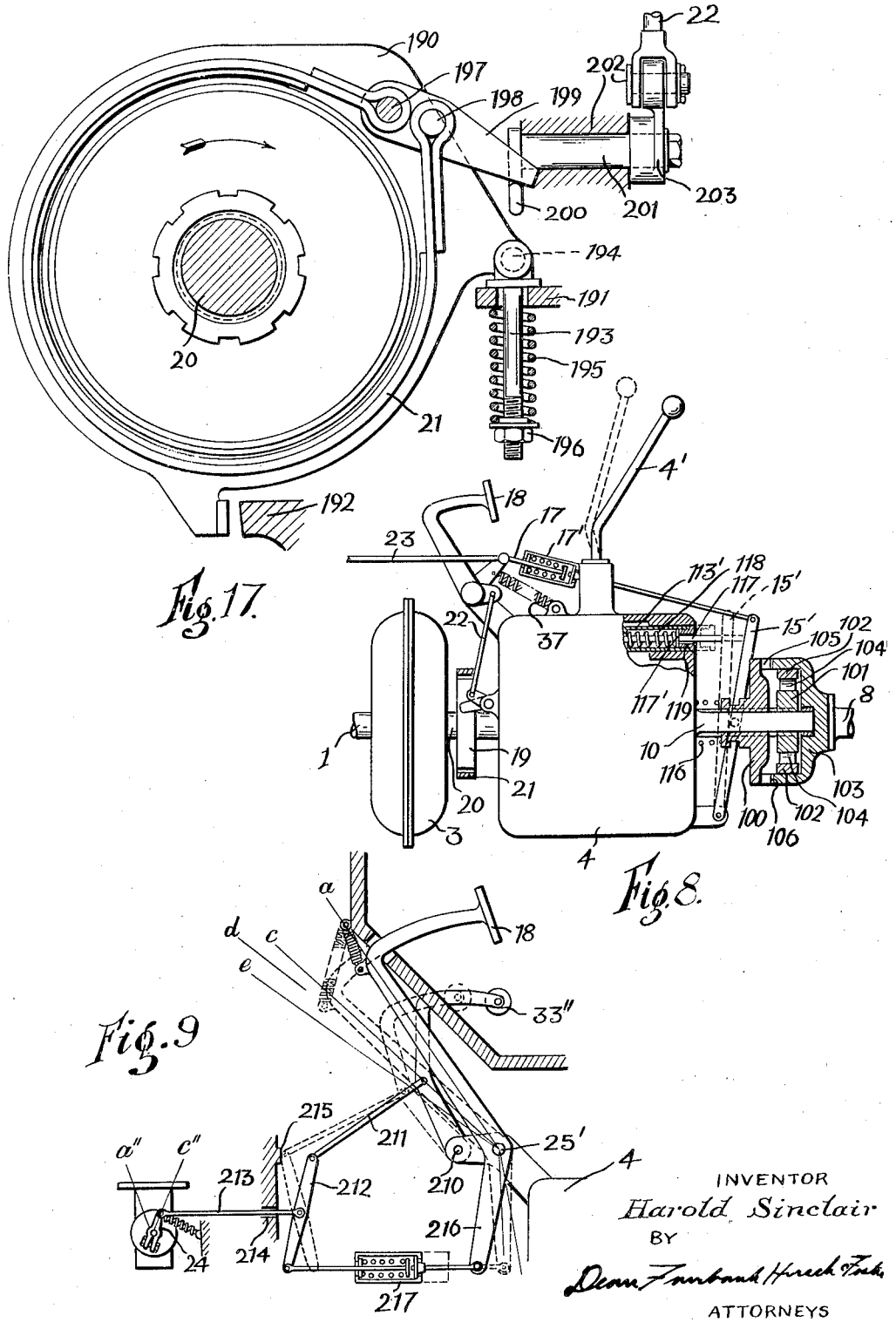

Dec. 21, 1937.  H. SINCLAIR  2,102,755
POWER TRANSMISSION MECHANISM
Filed Sept. 19, 1931  5 Sheets—Sheet 5
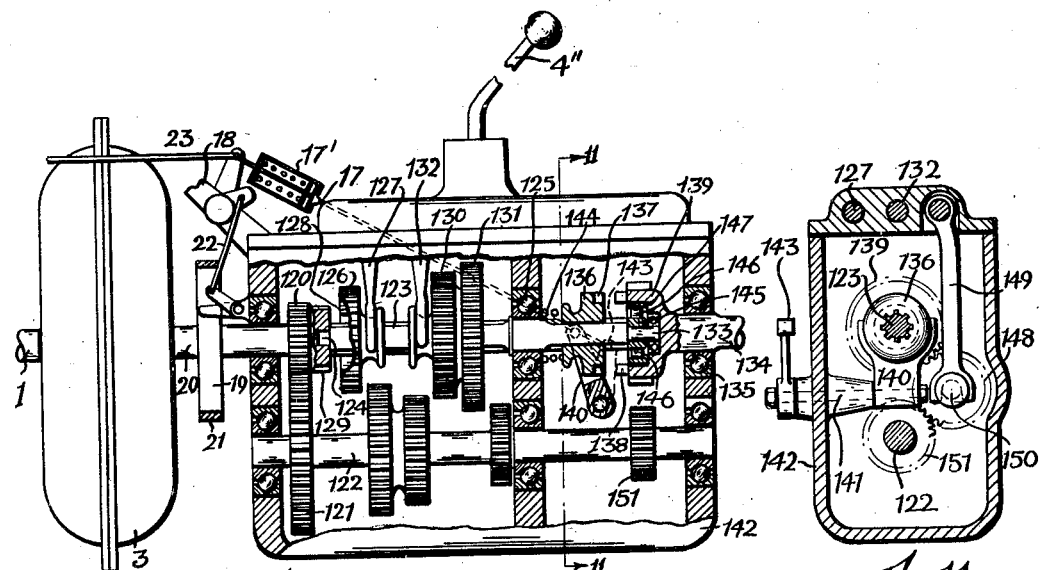
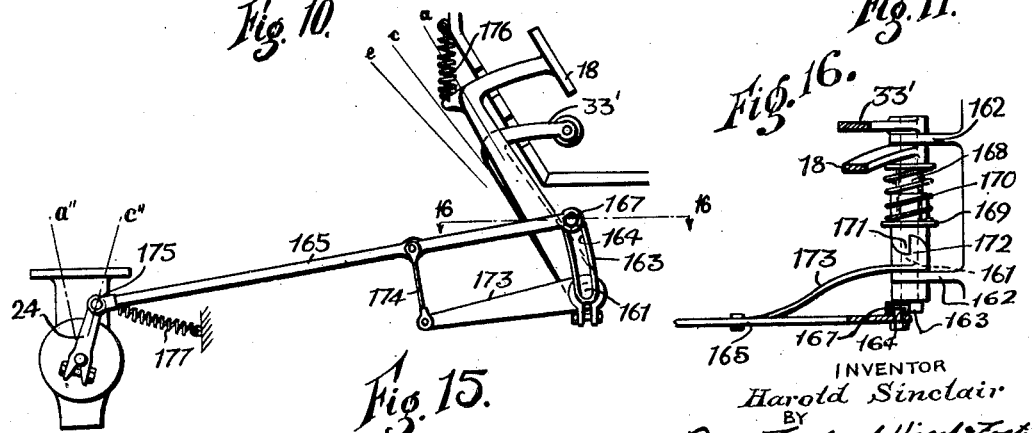
INVENTOR
Harold Sinclair
BY
Dean Fairbank Hirsch Foster
ATTORNEYS Patented Dec. 21, 1937

2,102,755

UNITED STATES PATENT OFFICE 2,102,755

POWER TRANSMISSION MECHANISM

Harold Sinclair, Surbiton Hill, England

Application September 19, 1931, Serial No. 563,788
In Great Britain September 25, 1930

24 Claims. (Cl. 192—.01)

The present invention relates to power transmission mechanisms and is more particularly, but not exclusively, concerned with transmission mechanisms for vehicles.

In my British patent specification No. 285,970 there is described a transmission system which comprises a hydraulic coupling, a friction clutch, and a gear box, both the hydraulic coupling and the friction clutch being located between the engine and the gear box.

It has also been proposed to provide, between an engine and a gear box, a hydraulic coupling without any other means for disconnecting the engine from the gear box. In such arrangements either the degree of filling of the hydraulic coupling has been made variable so that the connections can be interrupted when desired, or else a constant-mesh type gear box incorporating friction clutches has been used.

An object of the present invention is to provide a transmission system, in which a hydraulic coupling is arranged, without other declutching means, between the engine and the gear box, the arrangement being such that the hydraulic coupling may be of the constant filling type and the gear box may be of the common sliding gear type, but nevertheless no skill is required to effect silent gear changes, under all driving conditions. In this way a cheap and simple transmission system can be provided. The invention is not however, limited to the use of this particular type of hydraulic coupling or gear box. With all conventional types of automobile transmission comprising one or other combination of friction clutch or clutches and change-speed gears, it is a serious shortcoming that it is possible, after declutching, to reconnect the drive when the engine is racing, so that a heavy shock is imposed on the transmission system. It is a feature of the present invention that risk of such shocks is eliminated or greatly reduced, means being provided which, after the transmission of power has been interrupted, for example to allow of gear changing, either enable the speeds of the driving and driven elements of the interrupting means to be easily equalized, or ensure that they will be equalized, before the drive is reconnected.

In order to permit of the engagement of a gear when the engine is running and the driven shaft of the system is at rest, a brake may be provided which can be operated in known manner to arrest the driven element of the hydraulic coupling. This brake must be powerful enough to overcome the relatively high torque that is transmitted by the hydraulic coupling when the engine is running at idling speed. The brake furthermore acts on a part of the transmission system that normally runs at a high speed. It has been found that, in the case of an automobile, if the brake is applied when the vehicle is running with a gear engaged, its action is so fierce, particularly when low gear is engaged, that dangerous skidding of the vehicle easily results. A further object of the present invention is to provide means for eliminating this risk.

A number of embodiments of the invention, as applied to motor vehicles, will be described by way of example with reference to Figs. 1 to 17 of the accompanying drawings, in which:

Fig. 1 is a part-sectional diagrammatic view of an automobile chassis provided with a power-transmission system according to the invention.

Figs. 2, 3 and 4 show, also in part-sectional diagrammatic form, respectively, three arrangements of automobile transmission systems alternative to that shown in Fig. 1.

Figs. 5 and 6 are diagrammatic views, to an enlarged scale, of parts shown in the preceding Figs. 1 to 4.

Fig. 7 is a graph illustrating the operation of control means.

Fig. 8 is a part sectional diagrammatic elevation of an arrangement alternative to that shown in Fig. 4.

Fig. 9 is a diagrammatic side elevation of another form of controlling means.

Fig. 10 shows diagrammatically a part sectional side elevation of yet a further modification.

Fig. 11 is a sectional end elevation on the line 11—11 in Fig. 10.

Fig. 12 is a sectional side elevation of a detail modification.

Fig. 13 is a sectional end elevation on the line 13—13 in Fig. 12.

Fig. 14 is a plan view of a part of the detail shown in Figs. 12 and 13.

Fig. 15 is a diagrammatic side elevation of alternative controlling means.

Fig. 16 is a sectional plan on the line 16—16 in Fig. 15.

Fig. 17 is a diagrammatic front elevation of a detail, and

Fig. 18 is a longitudinal section through a form of hydraulic coupling which may be employed.

Referring to Fig. 1, the crank shaft 1 of an internal combustion engine 2 is coupled through a hydraulic coupling 3 of the Vulcan (or so-called Föttinger) type to a multi-ratio gear box 4 of the sliding gear type.

Between the driven shaft of the gear box 4 and the driven shaft 5 of the transmission system (namely the road wheel axles) there is provided a friction clutch in parallel with a simple free-wheel device. The friction clutch 6 comprises an inner conical member 9 and an outer conical member 67 within which is fixed the driven element 68 of the free-wheel device. The conical member 67, and with it the front end of the shaft 8, is supported by an extension of shaft 10 journalled in the front of the conical member 67, and an intermediate bearing 11 supports the rear end of shaft 8, which is coupled by the front universal joint 12 to the secondary propeller shaft 13, which is geared in known manner to the axle shafts 5. The inner clutch member 9 is provided with internal splines engaging with splines formed on the shaft 10. A spring 14 normally presses the clutch member 9 against the clutch member 67, the clutch then being capable of transmitting the maximum torque applied by the engine to the shaft 10. An actuating lever 15 co-operating with a groove 16 formed on the hub of the clutch member 9 is connected by a link 17 to a control pedal 18 in such a way that, when the pedal is depressed, the clutch member 9 is forced forward against the pressure exerted by the spring 14 and out of engagement with the clutch member 67. Fixedly mounted on the gear shaft 10 is the driving element 69 of the free-wheel device, the wedging elements 70 being disposed in the annular space between the elements 68 and 69. The arrangement is such that, when the friction clutch is engaged, the gear shaft 10 is coupled to the propeller shaft 8, and when the friction clutch is disengaged, by depression of the control pedal 18, the propeller shaft 8 is free to over-run the gear shaft 10, while the gear shaft is still adapted to drive the propeller shaft in the forward direction, through the free-wheel device. With this arrangement, the free-wheel may be permitted to take up the drive, for example, after the gear has been changed, before the friction clutch is re-engaged, so that there is no shock, and no wear due to slipping of the friction clutch.

A brake drum 19 is keyed to the shaft 20 connecting the hydraulic coupling 3 to the gear box 4. Co-operating with this brake drum is a brake band 21 actuated by the pedal 18 through a link 22.

The arrangement is shown in more detail in Fig. 17. A rocking plate 190 is mounted on a bearing concentric with the shaft 20, its range of oscillation being limited, in the normal direction of rotation of the shaft 20, by a fixed stop 191, and in the reverse direction by a fixed stop 192. An eyebolt 193 is pivotally connected at 194 to the rocking plate 190 and passes freely through a hole in the stop 191. A helical spring 195 surrounding the eyebolt is compressed between the stop 191 and a nut 196 threaded on to the eyebolt. One end of the brake band 21 is pivotally carried on a stud 197 fixed to the rocking plate 190, and the other end of the brake band is pivotally carried on a pin 198 fixed to a lever 199 one end of which is journalled on the stud 197. The other end of the lever 199 cooperates with a forwardly projecting lever 200 fixed to a spindle 201 journalled in a fixed bearing 202. Another forwardly projecting lever 203 is fixed to the spindle 201, and its front end is pivotally connected to the link 22. The operation of this arrangement is as follows: Assuming that the shaft 20 and the drum 19 are rotating in the normal running direction, as indicated by the arrow in Fig. 17. If now the control pedal 18 is partially depressed, the link 22 and levers 203 and 200 are raised, and the front end of lever 200 contacts with the lever 199 which is thereby rotated anti-clockwise about the stud 197, drawing the brake band 21 into contact with the drum 19. If the pedal is depressed when the drum 19 is at rest, it will be able to move further and cause the free end of the lever 199 to be raised still further, and, as soon as the brake band 21 is fully applied to the drum 19, the lever 199 is unable to rotate further about the stud 197, with the result that the further raising of the lever 199 causes the rocking plate 190, and with it the band 21 and the drum 19 to be rotated through a small angle anti-clockwise, that is to say, in a direction opposite to the normal direction of rotation of the shaft 20. When the pedal 18 is allowed to rise, the spring 195 serves to restore the rocking plate to its normal position. Such rocking device is more completely described and illustrated in my co-pending application Serial No. 563,789, filed on even date herewith.

The control pedal 18 is connected by a third link 23 to the throttle lever 24 of the engine 1 in such a way that depression of the pedal 18 causes the throttle to be closed and the engine torque thereby to be reduced, irrespective of the position of the normal independent throttle control pedal (which is not illustrated in Fig. 1). It is to be understood that the arrangement of controlling links 17, 22, and 23 and of the control pedal 18 is merely shown diagrammatically in Fig. 1. The connection between the pedal 18 and the link 17 is shown in Fig. 5. The pedal, which is fixedly mounted on a shaft 25, carries a roller 26. This roller co-operates with a cam 27 fixed to a shaft 28 whose axis is eccentric with respect to the axis of the shaft 25. The shafts 25 and 28 are suitably journalled on the gear box 4. To the shaft 28 is keyed a lever 29 to which is pivotally attached the link 17. The cam profile is so shaped that during the initial movement of the pedal 18, say from the position a shown in Fig. 5 to position b, the lever 29 moves from a' to b', and during further movement of the pedal, say from b to e, the lever moves through a small angle between b' and e'. The link 17 includes a spring link 17' of the type that will transmit a limited tensile force without change of length, but yields when loaded with a higher tensile force. In this case the limited force is sufficient to overcome the compressive force of the clutch spring 14.

The connection between the pedal 18 and the throttle lever 24 is shown in Fig. 6. Fixedly mounted on the pedal shaft 25 is a lever 30, to which is fixed a pin 31 slidably fitted in an elongated eye 32' formed on one end of a spring link 32 of the kind that will transmit a limited tensile force without extension, but yields when loaded with a higher tensile force. The other end of the link 32 is pivotally attached to one arm of a bell-crank lever 34, the other arm of which is pivotally connected by the link 23 to the throttle lever 24, which is shown in the idling position. The length of the eye 32' is such that the throttle lever 24 may be moved to the full-open position without movement of the pedal 18. A normal separate accelerator pedal 33 (shown in its raised position) is provided for operating the throttle through a spring link 35, similar to the link 32, and connected to a lever 34' arranged for rotation positively with the bell-crank lever 34. A tension spring 36 tends to retain the throttle in the idling position. The spring link 32 is stiff enough to extend fully the spring link 35 without itself yielding. The range of movement permitted by the spring link 35 is sufficient to allow the throttle 24 to be shut (that is, moved from position a'' to c'') by partial depression of pedal 18 even though the pedal 33 may be fully depressed. A spring 37 serves to retain the pedal 18 in its raised position.

The control pedal 18 is so connected that its depression effects three distinct operations in predetermined sequence. Firstly, assuming that the throttle has been opened by depressing the pedal 33, the link 32 being thereby raised so that the pin 31 occupies the lower part of the eye 32', then rotation of the pedal shaft 25 rotates lever 30 which, acting through link 32 and bell-crank 34, draws link 23 backwards, shutting the throttle 24 and thereby reducing the engine torque. Extension of the spring link 35 allows the throttle pedal 33 to remain depressed. Secondly, rotation of the pedal shaft 25 moves the roller 26 (Fig. 5) which, by sliding over the cam 27, causes rotation of the shaft 28 and the lever 29, whereby the link 17 is drawn forwards. This movement of the link 17 rocks lever 15 (Fig. 1) and the clutch 6 is thereby disengaged. Should the clutch member 9 offer undue resistance to withdrawal under load (for example, owing to the friction on the splines by which it is mounted on shaft 10) the spring link 17' extends, and allows the pedal 18 to be depressed further. Consequently, the throttle 24 may still be closed, and as soon as the torque transmitted from the shaft 10 to the clutch member 9 has fallen sufficiently to allow the clutch 6 to be disengaged, the spring link 17 contracts and thereby forces the clutch member 9 against the pressure of the clutch spring and out of engagement with the clutch member 67. Thus the propeller shaft 8 is now free to over-run the gear shaft 10. Thirdly, further movement of the pedal 18 causes the brake band 21 to be forced into contact with the drum 19, with the result that the speed of rotation of shaft 20 is retarded, the further movement of the lever 30, with the pedal shaft 25, after the throttle has been shut, being permitted by extension of the spring link 32.

The sequence of these three operations is shown graphically in Fig. 7, where the travel of the pedal 18 is plotted horizontally. The reference letters a, b, c, d, e indicate positions corresponding to those shown by the same reference letters in the figures. Throttle movement is shown by a full line, clutch withdrawal by a dotted line, and brake application by a chain-dotted line.

The operation of the power transmission system described above is carried out as follows: The car being stationary and the change-speed gear lever 4' being in neutral, the engine is started in the usual way, and when it is running the drag in the hydraulic coupling 3 causes the shaft 20 to be carried round by the crankshaft 1. To enable a gear to be engaged, for example first gear, the pedal 18 is partially depressed, with the result that the brake band 21 is forced into contact with the brake drum 19 which is thereby brought to rest, together with the driven element of the coupling 3 and the gear box parts arranged for rotation positively therewith. The gear control lever 4' is now moved into the first gear position in the usual manner. First gear being engaged, the pedal 18 is allowed to rise, and owing to the low torque transmitted by the hydraulic coupling 3 while the crank shaft 1 is running at idling speed, the car remains stationary. To set the car in motion, the throttle pedal 33 (Fig. 6) is depressed, causing the engine speed to increase, and as a result the torque transmitted by the hydraulic coupling rises to a value sufficient to overcome the tractive resistance of the car, which begins to accelerate. As the engine speed increases, the slip in the hydraulic coupling gradually decreases (in accordance with the inherent torque characteristic of the coupling), falling to a very low value at ordinary running speeds. When it is desired to change gear, the pedal 18 is partially depressed (towards position d). As a result of this movement, the engine torque is reduced, the clutch 6 is disengaged and thereby renders the connection between the gear box 4 and the road wheels unidirectional, and the brake band 21 engages drum 19. As the engine speed now falls rapidly, thus permitting slip to take place in the hydraulic coupling 3, and as the gear box 4 cannot now be driven by the road wheels, application of the brake band 21 rapidly retards the rotation of the shaft 20 and of the parts within the gear box rotating therewith. The gear lever 4' may now be moved straight through into the next gear position, since the speed of the gear box pinions is very low. The pedal 18 is now permitted to rise again, thereby the brake band 21 is disengaged from the drum 19 and the engine throttle 24 is opened, with the result that the engine accelerates and the drive is taken up through the free-wheel, the clutch 6 then being re-engaged when there is no relative motion between its parts 9 and 67. Thus the drive in the forward direction is normally always taken up by the free-wheel, so that there is no slipping and wear of the clutch, or shock due to its engagement, nor is there risk of clutch slip developing during normal forward driving even in low gear on very steep gradients. Furthermore, the free-wheel is normally locked by the clutch, being only used as a free-wheel during gear-changing operations, so that its wear is a minimum, and the braking power of the engine is also available during all normal driving. The friction clutch serves to lock the free-wheel to permit driving in reverse gear.

Changes from any low gear to any higher gear, and vice versa, may be carried out while the vehicle is in motion, in a similar manner to that described above.

When the vehicle has been brought to rest on a gradient with one of the gear ratios (for instance top gear) still engaged, and it is desired to change to a lower gear to allow the vehicle to be set in motion again, it may be that even while the engine is idling the torque transmitted by the hydraulic coupling (through the free-wheel to the road wheels when clutch 6 is disengaged) is sufficient to produce such a load on the engaged gears (or dog clutch as the case may be) that it is difficult to slide them out of engagement. Under such circumstances it is only necessary to depress the control pedal 18 fully, when the rocking brake will engage the stationary transmission shaft 20 and rotate it far enough in the reverse direction to relieve the load on the engaged gears and allow them to be slid out of mesh and the desired gear to be engaged.

An automobile provided with a transmission system as described above is particularly suitable for an unskilled driver since it enables gear-changing to be performed by simply depressing the pedal and shifting the gear lever without manipulation of the ordinary normal throttle control and without the need for accurately timing a sequence of control operations such as is essential with conventional systems. It has the further advantage that a driver experienced in automobiles of ordinary type will be able to change gear with the improved system described above without difficulty, even though he may perform unnecessary control operations to which he is accustomed, such as double-declutching. Should a driver mishandle the transmission system, for example by allowing the control pedal 18 to spring up instantaneously, (before the free-wheel has taken up the drive), the transmission system will be protected against shock loading when the clutch 6 re-engages, owing to the fact that the hydraulic coupling momentarily has a very low torque-transmitting capacity and therefore serves to absorb the shock. If the driver engages too low a gear, for example, engages bottom gear while the vehicle is moving at high speed, the hydraulic coupling will reduce the shock on the transmission system when the control pedal is released.

In this invention the use of a Vulcan hydraulic coupling is preferred, but any other suitable type may be employed. The hydraulic coupling may have a constant liquid filling, and the necessary variation in slip, for starting and traffic driving, may be that due to the inherent properties of the hydraulic coupling at varying engine speeds. If desired however, regulating means may be provided for increasing the slip at low speeds, for example, by reducing the degree of filling or by obstructing the hydraulic circuits of the coupling. Such regulating means may be made either manually operable or their operation may be made automatic and dependent, for example, on the speed of the driving or driven elements of the coupling.

An example of a manually operable device for obstructing the hydraulic circuits is given in Fig. 18, which shows a hydraulic coupling more fully described in my Patent No. 1,831,770. There is fixed to the crank-shaft 1 a casing 250 to which is fixed an impeller 251. A runner 252 is fixed to a sleeve 258 slidable and rotatable on an extension 1a of the shaft 1. The rear end of this sleeve is slidably engaged with the shaft 20 by splines 262. The sleeve is urged to the rear by a compression spring 260 fitted between the boss of the impeller and a flange 261 on this sleeve, and it can be displaced towards the crankshaft by means of pedal-operated means (not shown) acting on the rear of the flange 261. A plurality of two-armed radial levers, such as 256, are pivotally mounted on the impeller, as at 257, and their inner arms engage in a groove 259 in the sleeve 258, while their outer arms engage in radial holes, such as 254a, in a ring valve 254 slidably fitted within a cylindrical guide formed on the impeller core guide member 253. When the sleeve is moved forward by the pedal, the levers are thereby rocked so as to move the ring valve into the circuit, the impeller vanes being provided with gaps 255 through which this valve passes. Radial slots, such as 253a, accommodate the outer arms of the levers 256.

The gear box may be of any other known or suitable kind, for example, a constant-mesh type in which the different ratios are engaged by means of jaw clutches, but with this type also as arranged according to the present invention it requires no skill to effect silent gear-changes.

The friction clutch between the gear box and the road wheels may be of any suitable type, such as the cone-clutch illustrated in Fig. 1, or it may be a disk or a multiple-plate clutch.

In an alternative embodiment of the invention in place of the friction clutch and parallel free-wheel device shown in Fig. 1, there is provided a simple free-wheel device. Such a device transmits torque in one direction only, that is to say, it allows the engine to drive the road wheels in a forward direction, but does not permit the road wheels when running forwards to drive the engine. The free-wheel device is preferably provided with emergency locking means to enable it to be put into condition to transmit torque bidirectionally, but such provision is not essential. The free-wheel device illustrated by way of example in Fig. 2 is one of the kinds described in British patent specification No. 261,486. This comprises an outer annular driving member 57 and an inner driven cam 58 between which are placed rollers 59, spaced apart by a cage 60, and adapted to be wedged between the driving member 57 and the cam 58 in both directions of rotation. A disk 61 provided with an internally splined central boss is mounted on a correspondingly splined part of the propeller shaft 8 in such a way that it rotates positively with, but is free to slide longitudinally of the shaft 8. The disk 61 is forced away from the cam by springs 62 but may be forced towards the cam by means of a forked lever 63 operated by a control handle 64. Tapered pegs 65 screwed into the cage 60 co-operate wtih holes 66 drilled through the disk 61.

When the control handle 64 is lowered, the disk 61 is forced away from the cam by the springs 62, and the cage 60 is free to move far enough in both directions of rotation to allow the rollers to wedge both when torque is applied to the device in one direction and when it is applied in the opposite direction. When the handle 64 is raised, the disc 61 is forced towards the cam, and as the wider part of the tapered pegs 65 is now within the holes 66, the range of movement of the cage 60 relative to the cam 58 is restricted so that while the rollers are free to wedge when the engine is driving the road wheels, they cannot move far enough relative to the cam to wedge when the direction of the torque is reversed. In this condition therefore, the device acts as an ordinary free-wheel device. The free-wheel condition is the normal running condition, while the locked condition may be used for emergency, such as when it is desired to reverse the vehicle, or to employ the engine as a brake. In order to allow the torque load to be released from engaged gears while the engine is running and the vehicle is stationary, the rocking brake band 21 is provided, and this is connected by the link 22 to the control pedal 18 which also operates the throttle 24 through link 23. The throttle and the rocking brake may be controlled by the pedal 18 in the same way as has been described with reference to the arrangement shown in Fig. 1.

When the control handle 64 is in the raised (normal) position, the propeller shaft 8 is free to over-run the gear shaft 10, and when the control pedal 18 is partially depressed while the vehicle is in motion (for instance in order to allow the gear to be changed) the link 22 applies the brake band 21 to the drum 19 and the speed of rotation of the gear box parts is thereby retarded so that gear-changing may be facilitated. When the desired gear has been re-engaged, the pedal 18 is allowed to rise, and, on the throttle being opened, the gear shaft 10 is accelerated. As soon as the speed of this shaft equals the speed of the propeller shaft 8, the free-wheel device transmits the driving torque from the engine to the road wheels.

In the further alternative embodiment shown in Fig. 3, there is disposed between the gear box and the road wheels a "two-condition" free-wheel, that is to say, a free-wheel device adapted, for the purpose of gear-changing, to be transformed from its normal bi-directionally-coupled condition to its unidirectional (free-wheel) condition. The type of free-wheel illustrated by way of example is that described in British patent specification No. 239,894 in which diagonally disposed wedging rollers lie between conoidal roller paths. A splined shaft 79 is mounted by a spigot bearing 80 on the rear of the gear shaft 10, and the rear end of shaft 79, to which is fixed the front universal joint of the propeller shaft, is supported by a bearing 11 suitably housed in a fixed part of the chassis. A disk 81 is splined to the gear shaft 10, and to this disk are bolted the forward drive outer conoidal roller path 82 and the reverse drive outer conoidal roller path 83. A forward drive inner conoidal roller path 84 is splined to the shaft 79 and forced to the rear by springs 85 abutting against a flange 86 formed on the bush of the spigot bearing 80. The forward drive rollers 87 have their axes so inclined that they can transmit torque, applied in the normal direction of rotation of shaft 10, only from the outer path 82 to the inner path 84. A reverse drive inner conoidal roller path 88 is also splined to the shaft 79 and adapted to be forced forward by springs 89 which act between a ring 90 and nuts 91 and 92 locked together on a threaded rearward extension 88' of the inner reverse path 88. The rearward drive rollers 93 have their axes so inclined that they are adapted to transmit torque, applied in the normal direction of rotation of shaft 10, only from the inner path 88 to the outer path 83. Slidably mounted on the extension 88' is a sleeve 94, the enlarged front end of which bears against the outer reverse path 83. Balls 95 rest in a wedge-shaped groove formed between the front face of the nut 92 and the bevelled rear face of the sleeve 94. A grooved actuating ring 96 is slidably mounted on the sleeve 94 and actuated by a lever 97. This lever is pivoted at 98 on a fixed part of the chassis frame and pivotally connected to the link 17. Part of the inner surface of the grooved ring 96 is conical, the larger diameter being to the rear.

The oscillating brake on the shaft 20 and the throttle control link 23 are provided as described above. The operation of the device is as follows: When power is being transmitted from the engine to the road wheels, the gear shaft 10 rotates in a clockwise direction, as viewed from the front. The shaft 10 carries round with it the forward and reverse outer paths 82 and 83 respectively. The flanged forward inner path 84 is pressed to the rear by the springs 85, and therefore presses the rollers 87 into contact with the outer path 82. The rollers tend to roll over the conoidal face of path 82 from an orbit of larger diameter to an orbit of smaller diameter, and thus tend to draw the flanged inner path 84 to the rear, with the result that the rollers become firmly wedged and driving torque is transmitted positively from the shaft 10 to the shaft 79. When the vehicle tends to over-run the engine—for instance, when running down hill with the engine acting as a brake and the control pedal 18 fully raised (position a, as shown in Fig. 3)—torque transmitted from the propeller shaft is applied to the flanged inner reverse roller path 88, which is forced forward by the springs 89 and therefore presses the rollers 93 into contact with the outer path 83. These rollers tend to roll over the conoidal face of path 83 from a larger to a smaller orbit, and thus tend to draw the flanged inner path 88 forward, with the result that the rollers become firmly wedged and the over-running torque is transmitted positively from the shaft 79 to the shaft 10. Thus it is evident that, when the control pedal is raised, the device is capable of transmitting both driving torque from the engine to the road wheels and over-running torque from the road wheels to the engine.

When the control pedal 18 is partially depressed to position b, or fully depressed to position e, the grooved ring 96 is thereby forced rearwards by the lever 97 and thus drives the balls 95 farther into the wedge-shaped groove between the sleeve 94 and the nut 92, with the result that the reverse inner roller path 88 is forced to the rear relative to the outer path 83, and the annular gap between these two paths is so widened that the rollers 93 are unable to become wedged between the paths. When the device is in this condition (the control pedal 18 being for instance, in position b), driving torque may be transmitted, as described above, from the shaft 10, through the forward drive rollers 87 and thence through the shaft 79. When the vehicle tends to over-run the engine (for instance, when the control pedal 18 is in position e) the reverse drive rollers 93 being inoperative, the torque applied by the forward drive inner path 84 to the rollers 87 serves to release these rollers from the outer path 82 with the result that the path 84 is free to rotate clockwise as viewed from the front, relative to the path 82. Thus the device is now adapted to operate as a simple free-wheel coupling. The condition of the free-wheel device in relation to the position of the control pedal is indicated in Fig. 7 by the words "Locked" and "Free" shown therein in brackets.

Instead of the type of two-condition free-wheel illustrated in Fig. 3, any other suitable type may be employed.

In a further alternative arrangement shown in Fig. 4, the two-condition free-wheel comprises a simple free-wheel in parallel with a jaw clutch. Slidably splined to the gear shaft 10 is a grooved jaw clutch member 100 operated by a lever 15". The driving member 101 of the free-wheel is fixed to the shaft 10, while the driven member 102 of the free-wheel is fixed to a dished member 103 to which the propeller shaft 8 is suitably attached. The free-wheel wedging elements are denoted by 104. Teeth 105 on the slidable jaw clutch member 100 co-operate with teeth 106 formed on the edge of the dished member 103. Thus when the control pedal 18 is in the raised position, the teeth 105 may engage with the teeth 106, so that the shaft 10 becomes positively locked to the shaft 8. When the pedal 18 is depressed, the teeth of the jaw clutch are disengaged, and the device is now adapted to operate as a simple free-wheel.

The ends of the teeth may be shaped obliquely so that if the two sets of teeth come into contact when the propeller shaft is over-running the gear box shaft, the driven element rides over the driving element without shock until their speeds approach synchronism and engagement can take place to lock the free-wheel.

If desired, the foot pedal mechanism which is used to operate a disconnecting device comprising a free-wheel coupling and which is normally operated in gear changing, may be arranged with a spring-loaded snug or other suitable device for giving the pedal a slight bias (or even latching it) in the position when the free-wheel is just free, so that the driver can judge when this point is reached and pause to allow the engine when accelerated to take up the drive.

In automobile power transmission systems according to the present invention, and in which a free-wheel coupling is employed between the change-speed gear box and the road wheels, the coupling being of the two-condition kind as described and controlled by a link connecting with the control pedal or equivalent device operated for the purposes of gear changing, it may be necessary to provide means to enable the free-wheel coupling to become or remain locked bi-directionally when engaging reverse gear in order that the vehicle may be reversed under its own power. One method of providing such means will be described by way of example with reference to Fig. 4. The link 17 is pivotally connected to a bolt 107 slidably mounted in a housing 108 forming part of the gear box casing. On the rear end of the bolt 107 is pivotally mounted a bell-crank lever 109, a rearwardly projecting arm of which is provided with a hook 110 adapted to engage behind the lower end of a slot 111 formed in the end of the jaw-clutch actuating lever 15″. A vertical arm 112 of the bell-crank lever 109 traverses the axis of the reverse gear selector rod 113 of the gear box 4. The lower end of the slot 111 in the lever 15″ is provided with a bevelled front face 114 adapted to co-operate with a bevel 115 on the rear of the hook 110 formed on the lever 109. A spring 116 tends to retain the slidable jaw clutch member 100 in its engaged condition. In the condition shown in full lines in Fig. 4, forward movement of the link 17, due to depression of the control pedal 18, is transmitted by the bolt 107 and the lever 109 to the lever 15″, and the slidable clutch member 100 is thereby disengaged from the dished clutch member 103. If now it is desired to reverse the vehicle, the change-speed gear control 4′ is moved into the reverse position, thereby displacing the reverse gear selector rod 113 to the rear. The rear end of rod 113 strikes the arm 112 of the lever 109, and rotates this lever so as to disengage the hook 110 from behind the lower end of the slot 111, as shown by dotted lines. Lever 15″ is thereupon returned towards position $a'$ by the action of the spring 116, and as the slidable clutch member 100 is now free to engage with the dished clutch member 103, the vehicle may be set in motion backwards, by allowing the pedal 18 to rise and opening the throttle. After the reversing has been completed, the pedal 18 is depressed, the gear lever 4′ is moved out of its reverse position, and, as the pedal 18 is again released, the bevel 115 on the lever 109 rides up the bevelled face 114 of the lever 15″ allowing the hook 115 to latch into its normal position behind the slot 111.

A modification of the arrangement described in the immediately preceding paragraph is shown in Fig. 8. In this modified arrangement the link 17 is pivoted directly to the clutch-actuating lever 15′. The reverse gear selector rod 113′ is hollow and carries a plunger 117 forced to the rear by a strong spring 118 bearing against a collar 117′ formed on the plunger 117. A hollow plug 119 screwed into the end of the selector 113′ retains the plunger 117 in position. The selector is shown in its neutral position by full lines. When it is desired to reverse the vehicle, the pedal 18 is depressed, causing the lever 15′ to assume the position shown by dotted lines whereby the clutch member 100 is drawn forward out of engagement with the member 103. The gear lever 4′ is now moved into the reverse position, the selector 113′ assuming the position shown by dotted lines and being retained therein by the customary spring-loaded selector-lock (which is not illustrated). The plunger 117 is thus pressed against the lever 15′ by the spring 118, and as soon as the clutch teeth come into register, the spring 118 expands, forcing the plunger and the lever 15′ to the rear and compressing the weaker spring 17′, so that the clutch is re-engaged and a reverse driving torque may be transmitted therethrough.

An alternative arrangement providing for reversing in a transmission system according to the invention and comprising a free-wheel is shown in Figs. 10 and 11. The primary gear shaft 20 of a four-speed gear box is formed integral with a constant-mesh pinion 120 which drives a constant-mesh pinion 121 fixedly mounted on a countershaft 122. An intermediate splined gear shaft 123 is supported in a spigot bearing 124 in the primary shaft 20 and in an intermediate bearing 125. A third-gear sliding pinion 126, controlled by a selector 127 is provided with jaw teeth 128 adapted to co-operate with jaw teeth 129 formed on the primary constant-mesh pinion 120. The second and first gear sliding pinions 130 and 131 respectively are controlled by a selector 132. Thus it will be clear that the part of the gear box in front of the bearing 125 conforms to conventional design.

The intermediate gear shaft 123 projects behind bearing 125 and terminates in a journal 133. This journal supports the front end of a secondary gear shaft 134 which is also supported by a bearing 135. A slidable jaw-clutch member 136 splined on to the shaft 123 is provided with teeth 137 which are adapted to engage with teeth 138 on a pinion 139 formed integrally with the shaft 134. A forked striking lever 140, which is keyed to a shaft 141 journalled in the gear box casing 142, engages with a groove in the clutch member 136. To the outer end of the shaft 141 is keyed a lever 143 which is pivotally connected to the link 17. A spring 144 tends to retain the clutch member 136 in engagement with the clutch jaws on the pinion 139. In parallel with the jaw clutch 136, 139 is provided a free-wheel coupling comprising a driving member 145 fixed to the shaft 123, wedging elements 146, and a driven member 147 fixed within the hollow face of the pinion 139. This free-wheel coupling is adapted to transmit torque, in the direction of rotation of the engine, from the intermediate shaft 123 to the secondary shaft 134, while it permits the secondary shaft to over-run the intermediate shaft, in the same direction of rotation.

A slidable reverse gear pinion 148, controlled by a selector 149 (Fig. 11) is journalled on a pin 150 fixed in the gear box casing 142. The pinion 148 is adapted to engage with the pinion 139, and at the same time with a pinion 151 fixed to a rearwardly extending portion of the countershaft 122. When it is desired to engage a forward gear, or to change gear when the vehicle is running forwards, the pedal 18 is depressed, as previously described, and the clutch 136, 139 is thereby disengaged, whereupon the shaft 134 is free to overrun the shaft 123. Thus the speed of the gears may be reduced (for instance by braking the drum 19) irrespective of the speed of the vehicle. When it is desired to reverse the vehicle, the pedal 18 is depressed and, as soon as the countershaft 122 has been brought to rest by the action of the brake band 21, the reverse gear pinion 148 may be slid into engagement with the pinions 139 and 151 whereby the countershaft 122 is positively connected to the secondary shaft 134. Pedal 18 may now be raised, with the result that the engine torque is transmitted through the constant-mesh pinions 120, 121, the countershaft 122, the pinions 151, 148, 139 and the shaft 134, and thence to the road wheels, which may now be driven in the reverse direction.

In using a free-wheel coupling provided with a jaw clutch in parallel which serves to lock it bi-directionally, it may happen that, when a small torque is being transmitted by the free-wheel, the jaws of the clutch just fail to register, and when the torque is increased, elastic strain of parts of the free-wheel allows the clutch jaws to register and the clutch to be engaged. If now torque is reduced, release of strain in the free-wheel causes the clutch jaws to be jammed together and their subsequent disengagement is thereby rendered difficult or even prevented. In order to obviate this difficulty, there may be associated with one of the clutch members an elastic baulking device which prevents engagement of the clutch jaws until their relative positions are such that, upon engagement, a definite amount of backlash (against the resilience of the elastic baulking device) exists in the jaw clutch. One form of such a baulking device is shown by way of example in Figs. 12, 13 and 14 which are views to an enlarged scale of the two-condition free-wheel device used in the gear box illustrated in Figs. 10 and 11. The trailing faces (referred to the normal direction of rotation as shown by the arrow in Fig. 13) of two teeth 137' of the driving clutch member 136 are cut back, as shown at 180. Spring baulking arms 181 are attached by screws to the rear face of the member 136, their free ends 182 being so shaped that they lie partly in the cut-back portions 180. The action of these baulking members 181 is as follows. Assuming that torque is being transmitted through the free-wheel and that the leading edges of teeth 138 are just opposite the trailing edges of the full width teeth 137, if now the torque is increased so as to strain the free-wheel elastically, the trailing edges of the teeth 137 will move in advance of the leading edges of the teeth 138, but it will not be possible for the clutch to engage, although the teeth are now temporarily in register, because the leading edges of the two teeth 138 that are opposite the gaps 183 (Fig. 13) are in contact with the edges 182 of the baulking members 181. On the other hand, it may happen that, when the free-wheel is under a low torque, the clutch teeth are in register but prevented from engaging by the baulking members, and when the free-wheel is thereafter elastically strained under maximum torque, the leading edges of teeth 138 just clear the edges 182 of the baulking members, so that the clutch is free to engage under the action of the spring 144. When thereafter the torque is reduced and the strain in the free-wheel is released, the resilient members 181 are sprung back towards the face 180; hence the leading edges of the teeth 138 are free to move through the distance by which the resilient members 181 are normally clear of the cutback faces 180, and this distance is such that there is no possibility of any of the teeth 137 jamming against any of the teeth 138, which would prevent disengagement of the clutch.

An alternative method of controlling the engine throttle is shown in Figs. 15 and 16. A normal throttle control pedal 33' is keyed to one end of a shaft 161 supported in bearings 162. To the other end of the shaft 161 is keyed a lever 163 provided with an arcuate slot 164. A rod 165 pivotally connected to the throttle lever 24 by a pin 175 engages with the slot 164 by means of a T-headed bolt 167. The boss of the pedal 18 is extended forming an externally splined sleeve 168 mounted on, and rotatable relative to, the shaft 161. Slidably mounted on the sleeve 168 is an internally splined cam sleeve 169. A helical spring 170, compressed between the pedal 18 and the cam sleeve 169, forces cam projections 171 on this sleeve into engagement with corresponding projections 172 formed on the boss of a lever 173 which is rotatably mounted on the shaft 161. A pivoted link 174 connects between the end of the lever 173 and the rod 165. The length of the rod 165, measured between the centres of the pin 175 and of the screw 167, is made equal to the distance between the axis of the shaft 161 and the centre of the pin 175 in the position it assumes when the throttle is in the idling position. Springs 176 and 177 tend to retain the control pedal 18 and the throttle pedal 33' respectively in the raised position, as shown in Fig. 15. Normal control of the throttle lever 24 (shown in the idling position) is effected by the pedal 33', the bolt 167 being kept at the upper end of the slot 164 by the action of the spring 176. When the control pedal 18 is depressed to position c, the splined sleeve 168 is rotated, carrying with it the cam sleeve 169. The cam teeth 171 and 172 being kept in engagement by the pressure exerted by the spring 170, the lever 173 is thereby rotated with the pedal 18, and it causes the rod 165 to pivot about the pin 175 until the bolt 167 has been brought to the bottom of the slot 164 where it is co-axial with the shaft 161. By this means the throttle lever 24 is brought to its idling position, irrespective of the position of the throttle control pedal 33'. When the control pedal 18 is further depressed from position c to position e, for instance, for the purpose of actuating the rocking brake in the manner already described, the lever 173 is retained in its former position by the link 174, relative movement between the pedal 18 and the lever 173 being permitted by the cam teeth 171 and 172 which ride one over another, forcing the cam sleeve 169 towards the boss of the pedal 18 and compressing the spring 170. When the pedal 18 is released, the action of the spring 170 restores the normal relative positions of the pedal 18 and the lever 173.

A further alternative method of controlling the engine throttle is shown in Fig. 9. A normal throttle control pedal 33'' is pivotally mounted on a fixed pin 210 and is connected by a link 211 to the upper end of a floating lever 212. A link 213 connects the throttle lever 24, with the centre of the floating lever 212, and is located by a fixed guide 214. A fixed stop 215 limits the forward movement of the upper end of the floating lever 212. An arm 216 is mounted for rotation positively with the master control pedal 18 about its fixed pivot 25', and the lower end of the arm 216 is connected to the lower end of the floating lever 212 by an extensible spring link 217 of the kind that will transmit a limited tensile force without extension. The operation of this arrangement is as follows: In the configuration shown in full lines, the control pedal 18 and the throttle pedal 33'' are fully raised, and the throttle lever 24 is in the idling position. Depression of the pedal 33'' causes the floating link 212 to rotate anti-clockwise about the front end of the link 217 whereby the link 213 is moved forward and the throttle is opened. At full throttle the upper end of the floating lever 212 contacts with the stop 215. If the pedal 18 is depressed to position c after the throttle has been opened by depression of pedal 33'', the lower end of the floating lever 212 is drawn backwards by the link 217 and arm 216, with the result that the lever 212 rotates anti-clockwise about the front end of the link 211, whereby the link 213 is drawn backwards and the throttle lever 24 is returned to the idling position, the configuration now being as shown in dotted lines. Further depression of the pedal 18 from position c to position d extends the link 217 without changing the configuration of the remainder of the throttle-control mechanism.

In order to facilitate description, various methods of enabling the control pedal 18 to perform any particular function have been illustrated herein without reference to the other functions that it may be required to perform at the same time. However, to combine such methods as are required in any particular transmission system according to the present invention will present no difficulty to those skilled in the art, and it is therefore to be understood that the connections to the control pedal, which are merely indicated diagrammatically in several of the figures, may comprise any suitable combination. For example, if the power-transmission system is used in conjunction with a compression-ignition engine, the master control of the engine may be designed to regulate the fuel-pumps.

Although the invention has been described with special reference to road vehicles it is not limited to such uses. The transmission system according to the invention may, for example, be applied to locomotives, railcars, tanks, cranes, excavators (when multi-motion gearing is used) and for many other purposes.

I claim:

1. A power transmission system comprising a source of power, a multi-ratio gear box, a hydraulic coupling connecting between said source of power and said gear box, a driven shaft, a friction clutch connecting between the change-speed gearing of said gear box and said driven shaft, means for arresting the shaft connecting said hydraulic coupling to said gear box and rocking said connecting shaft backwards, means for regulating the output of said source of power independently of normal power-regulating means, and common controlling means initial operation of which simultaneously unclutches said friction clutch and actuates said means for independently regulating the power output so as to reduce the output of said source of power, further operation of which further reduces the output of said source of power, still further operation of which actuates said means for arresting said connecting shaft, and the final operation of which actuates said means for rocking said connecting shaft backwards.

2. A power transmission system comprising a source of power, a multi-ratio gear box, a hydraulic coupling connecting between said source of power and said gear box, a driven shaft, a controllable free-wheel device connecting between the change-speed gearing of said gear box and said driven shaft, means for changing the condition of said free-wheel device, means for arresting the shaft connecting said hydraulic coupling to said gear box and rocking said connecting shaft backwards, means for regulating the output of said source of power independently of normal power-regulating means, and common controlling means initial operation of which simultaneously changes the condition of said free-wheel device and actuates said means for independently regulating the power output so as to reduce the output of said source of power, further operation of which further reduces the output of said source of power, still further operation of which actuates said means for arresting said connecting shaft, and the final operation of which actuates said means for rocking said connecting shaft backwards.

3. In a power transmission system, a free-wheel coupling, a jaw clutch for bi-directionally locking said free-wheel coupling, and associated with one element of said jaw clutch, an elastic baulking device for limiting the range of rotation of one element relative to the other element of said jaw clutch, within which the jaws are engageable, to an angle smaller than the angular range of backlash existing between said elements when said jaws are engaged.

4. A power transmission system comprising a hydraulic coupling, a driven shaft, change-speed gearing for changing the transmission ratio between said hydraulic coupling and said driven shaft, a clutch device for disconnecting the drive between said hydraulic coupling and said driven shaft in at least one direction of relative rotation and adapted to prevent reconnection of the drive unless the speeds of the driving and driven elements of said clutch device are synchronized, and controlling means operable for engaging a rotatable element of the transmission system when that element is stalled and for imparting thereto a rotation sufficient to eliminate torque loading on said change-speed gearing.

5. A power transmission system comprising a hydraulic coupling, a driven shaft, change-speed gearing for changing the transmission ratio between said hydraulic coupling and said driven shaft, a free-wheel device for permitting said driven shaft to overrun said hydraulic coupling in the normal direction of rotation of the transmission system, and controlling means operable for engaging a rotatable element of said system, when that element is stalled and for imparting thereto a rotation sufficient to eliminate torque loading on said change-speed gearing.

6. A power transmission system as claimed in claim 5, wherein said free-wheel device is provided with locking means for putting it in condition to prevent said driven shaft from overrunning said hydraulic coupling.

7. A power transmission system as claimed in claim 5, wherein the driving and driven elements of said free-wheel device are connected together through a friction clutch.

8. A power transmission system comprising a hydraulic coupling, a driven shaft, change-speed gearing for changing the transmission ratio between said hydraulic coupling and said driven shaft, a clutch device for disconnecting the drive between said hydraulic coupling and said driven shaft in at least one direction of relative rotation and adapted to prevent reconnection of the drive unless the speeds of the driving and driven elements of said clutch device are substantially synchronized, controlling means, and means operable by said controlling means for imparting to the driven element of said hydraulic coupling, a slight rotation in a direction opposite to its normal direction of rotation.

9. A power transmission system as claimed in claim 8, wherein said means operable by said controlling means serve also for arresting the rotation of the driven element of the hydraulic coupling.

10. A power transmission system comprising a hydraulic coupling, a driven shaft, change-speed gearing having gear changing means for changing the transmission ratio between said hydraulic coupling and said driven shaft, means, additional to said gear changing means, for disconnecting the drive between said gearing and said driven shaft, controlling means, and means operable by said controlling means for engaging a rotatable element of said system between said hydraulic coupling and said gearing and thereby preventing said rotatable element from rotating.

11. A power transmission system comprising a source of power, means for regulating the output of said source of power independently of normal power regulating means, a hydraulic coupling connected to said source of power, a driven shaft, change speed gearing for changing the transmission ratio between said hydraulic coupling and said driven shaft, a clutch device for disconnecting the drive between said hydraulic coupling and said driven shaft in at least one direction of relative rotation and adapted to prevent reconnection of the drive unless the speeds of the driving and driven elements of said clutch device are substantially synchronized, means operable for imparting to the driven element of said hydraulic coupling a slight rotation in a direction opposite to its normal direction of rotation, and common controlling means for actuating both said means for rocking said driven coupling element backwards and said means for independently regulating the output of said source of power.

12. A power transmission system comprising a source of power, means for regulating the output of said source of power independently of normal power regulating means, a hydraulic coupling connected to said source of power, a driven shaft, change speed gearing for changing the transmission ratio between said hydraulic coupling and said driven shaft, a clutch device for disconnecting the drive between said hydraulic coupling and said driven shaft, a brake operable for arresting the driven element of said hydraulic coupling, and common controlling means for actuating both said brake and said means for independently regulating the output of said source of power.

13. A power transmission system comprising a source of power, means for regulating the output of said source of power independently of normal power regulating means, a hydraulic coupling connected to said source of power, a driven shaft, change speed gearing for changing the transmission ratio between said hydraulic coupling and said driven shaft, a clutch device for disconnecting the drive between said hydraulic coupling and said driven shaft in at least one direction of relative rotation and adapted to prevent reconnection of the drive unless the speeds of the driving and driven elements of said clutch device are substantially synchronized, a brake operable for arresting the driven element of said hydraulic coupling, which serves also for rocking said element backwards, and common controlling means for actuating both said brake and said means for independently regulating the output of said source of power.

14. A power transmission system comprising a hydraulic coupling, a driven shaft, change speed gearing for changing the transmission ratio between said hydraulic coupling and said driven shaft, a clutch device for disconnecting the drive between said hydraulic coupling and said driven shaft in at least one direction of relative rotation and adapted to prevent reconnection of the drive unless the speeds of the driving and driven elements of said clutch device are substantially synchronized, means for changing the condition of said clutch device, a brake for arresting the driven element of said hydraulic coupling, and common controlling means for actuating both said means for changing the condition of said clutch device and said brake.

15. A power transmission system comprising a hydraulic coupling, a driven shaft, change speed gearing for changing the transmission ratio between said hydraulic coupling and said driven shaft, a clutch device for disconnecting the drive between said hydraulic coupling and said driven shaft in at least one direction of relative rotation and adapted to prevent reconnection of the drive unless the speeds of the driving and driven elements of said clutch device are substantially synchronized, means for changing the condition of said clutch device, a brake for arresting the driven element of said hydraulic coupling which serves also for rocking said element backwards, and common controlling means for actuating both said means for changing the condition of said clutch device and said brake.

16. A power transmission system comprising a source of power, means for regulating the output of said source of power independently of normal power regulating means, a hydraulic coupling connected to said source of power, a driven shaft, change speed gearing for changing the transmission ratio between said hydraulic coupling and said driven shaft, a clutch device for disconnecting the drive between said hydraulic coupling and said driven shaft in at least one direction of relative rotation and adapted to prevent reconnection of the drive unless the speeds of the driving and driven elements of said clutch device are substantially synchronized, means for changing the condition of said clutch device, means operable for imparting to the driven element of said hydraulic coupling a slight reverse rotation, and common controlling means for actuating said means for changing the condition of said clutch device, said means for imparting to said driven coupling element a reverse rotation, and said means for independently regulating the output of said source of power.

17. A power transmission system comprising a source of power, means for regulating the output of said source of power independently of normal power regulating means, a hydraulic coupling connected to said source of power, a driven shaft, change speed gearing for changing the transmission ratio between said hydraulic coupling and said driven shaft, a clutch device for disconnecting the drive between said hydraulic coupling and said driven shaft in at least one direction of relative rotation and adapted to prevent reconnection of the drive unless the speeds of the driving and driven elements of said clutch device are substantially synchronized, means for changing the condition of said clutch device, a brake operable for arresting the driven element of said hydraulic coupling, means operable for imparting to said driven coupling element a slight reverse rotation, and common controlling means for actuating said means for changing the condition of said clutch device, said brake, and said means for independently regulating the output of said source of power.

18. A power transmission system comprising a source of power, means for regulating the output of said source of power independently of normal power regulating means, a hydraulic coupling connected to said source of power, a driven shaft, change speed gearing for changing the transmission ratio between said hydraulic coupling and said driven shaft, a clutch device for disconnecting the drive between said hydraulic coupling and said driven shaft in at least one direction of relative rotation and adapted to prevent reconnection of the drive unless the speeds of the driving and driven elements of said clutch device are substantially synchronized, means for changing the condition of said clutch device, a brake operable for arresting the driven element of said hydraulic coupling, which serves also for rocking said element backwards, and common controlling means for actuating said means for changing the condition of said clutch device, said brake, and said means for independently regulating the output of said source of power.

19. A power transmission system comprising a hydraulic coupling of the kinetic type having a driven element, a driven shaft, change speed gearing for changing the transmission ratio between said driven element and said driven shaft, a brake having a brakeable member connected for rotation with said driven element, and operable to arrest said element, a clutch device for disconnecting the transmission between said driven element and said driven shaft to permit of gear changing while said driven shaft is rotating, said clutch device being adapted to prevent reconnection of the drive until the speeds of the driving and driven elements of said clutch device are substantially synchronized, means for disengaging said clutch device in at least one direction of relative rotation of its driving and driven elements, and a control member for actuating said brake, said control member being so interconnected with said clutch disengaging means as to prevent application of said brake while said clutch device is engaged and while a forward gear of said gearing is engaged.

20. A power transmission system comprising a hydraulic coupling of the kinetic type having a driven element, a brake having a brakeable member connected for rotation with said driven element, a driven shaft, change speed gearing having an input shaft connected to said driven element and an output shaft connected to said driven shaft, a free wheel disposed between said driven element and said driven shaft, means operable for rendering said free wheel bi-directionally locked, and a control member operable for unlocking said free wheel to facilitate gear changing while said driven shaft is rotating and also operable to apply said brake so as to facilitate engagement of a gear when said driven shaft is at rest, said control member being so arranged as to be normally incapable of applying said brake until said free wheel is unlocked.

21. A power transmission for motor vehicles comprising in combination an engine shaft, a driven shaft, and a propeller shaft, a positive change speed gearing connected to said driven and propeller shafts, said transmission having a synchronizer operatively associated therewith, means to cause change of gear ratios in said transmission and actuate said synchronizer, a brake mounted on said driven shaft, a hydraulic power transmitter interposed between said engine and driven shafts, said transmitter comprising an impeller connected to the engine shaft and a turbine element connected to the driven shaft, whereby at low speeds the change of gear ratios may be effected in said transmission through the medium of said synchronizer and said hydraulic transmitter and similar changes may be made at high speeds through the medium of said synchronizer, brake, and transmitter.

22. A power transmission mechanism for motor driven vehicles comprising in combination an engine shaft, a driven shaft, a propeller shaft, a hydraulic power transmitter interposed between said engine and driven shafts, said transmitter comprising an impeller element connected to the engine shaft and a turbine element connected to the drive shaft, a positive change speed gearing located between said driven shaft and the propeller shaft, synchronizing means of the type in which power is transmitted bi-directionally through material under shear or bending loads operatively associated with the transmission mechanism, and means causing change of gear ratio in said transmission mechanism, whereby a change of gear ratio may be effected while drive is interrupted by the functioning of said synchronizing means, and a brake acting upon said turbine element whereby the change of gear ratio can be effected more rapidly through the medium of said brake functioning to cause or increase slip in the hydraulic transmitter.

23. A power transmission mechanism for motor driven vehicles comprising in combination an engine shaft, a driven shaft, a propeller shaft, a hydraulic power transmitter interposed between said engine and driven shafts, said transmitter comprising an impeller element connected to the engine shaft and a turbine element connected to the driven shaft, a valve adapted to be inserted into the hydraulic circuit for the purpose of controlling the circulation of the fluid in the transmitter, and means for actuating said valve, a positive change speed gearing located between said driven shaft and the propeller shaft, synchronizing means operatively associated with the transmission mechanism, and means causing change of gear ratio in said transmission mechanism, whereby a change of gear ratio may be effected while drive is interrupted by the functioning of said synchronizing means.

24. A power transmission mechanism for motor driven vehicles comprising in combination an engine shaft, a driven shaft, a propeller shaft, a hydraulic power transmitter interposed between said engine and driven shafts, said transmitter comprising an impeller element connected to the engine shaft and a turbine element connected to the driven shaft, a valve adapted to be inserted into the hydraulic circuit for the purpose of controlling the circulation of the fluid in the transmitter, and means for actuating said valve, a positive change speed gearing located between said driven shaft and the propeller shaft, synchronizing means operatively associated with the transmission mechanism, and means causing change of gear ratio in said transmission mechanism, whereby a change of gear ratio may be effected while drive is interrupted by the functioning of said synchronizing means, and a brake acting upon said turbine element whereby the change of gear ratio can be effected more rapidly through the medium of said brake functioning to cause or increase slip in the hydraulic transmitter.

HAROLD SINCLAIR.